Jan. 10, 1967     L. J. KAMM     3,297,924
CONTINUOUS PATH NUMERICAL CONTROL SYSTEM WITH
MECHANICAL INTERPOLATION
Original Filed July 10, 1961     4 Sheets-Sheet 1

INVENTOR
Lawrence J. Kamm

BY Max L. Libman
ATTORNEY

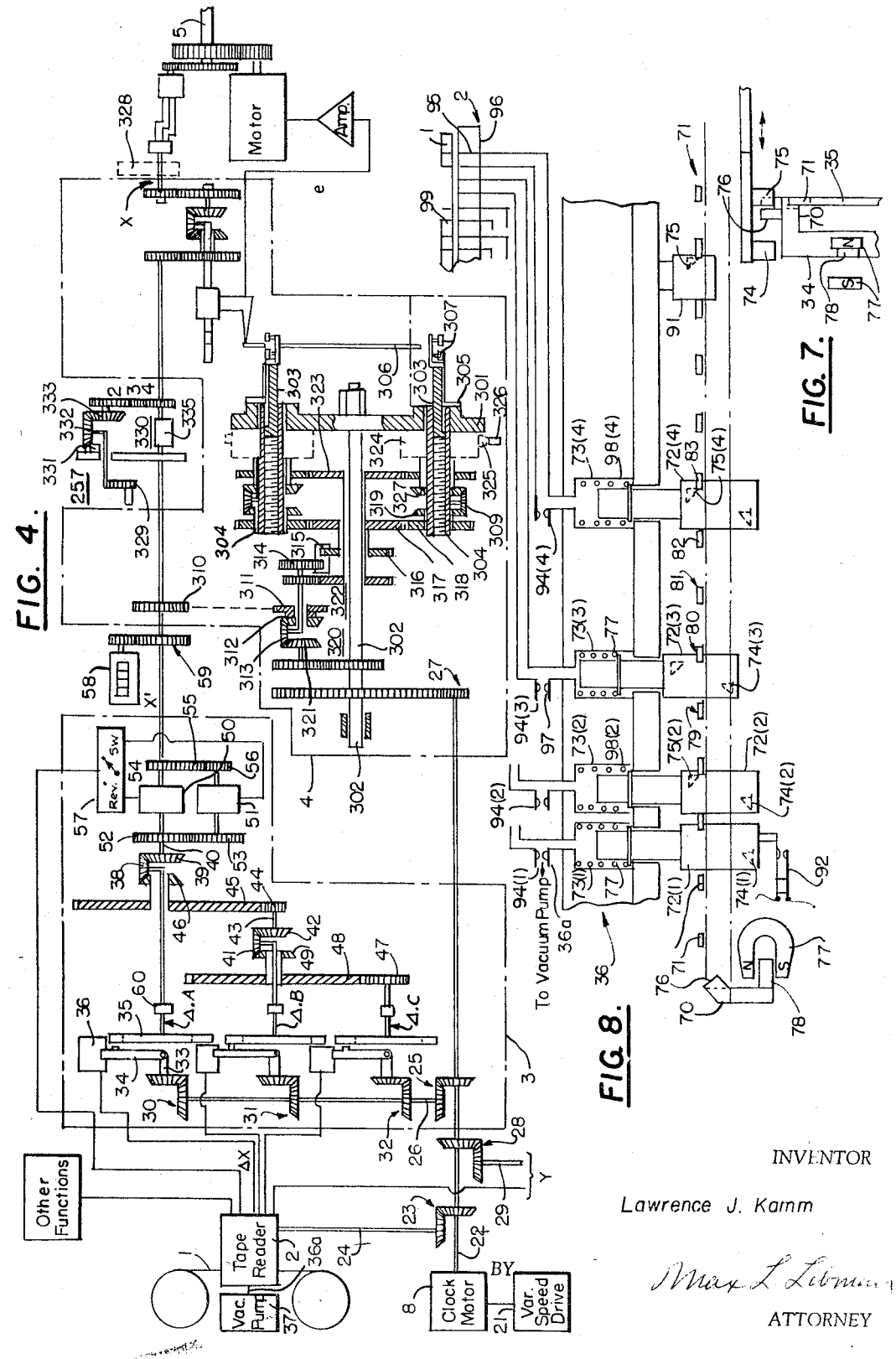

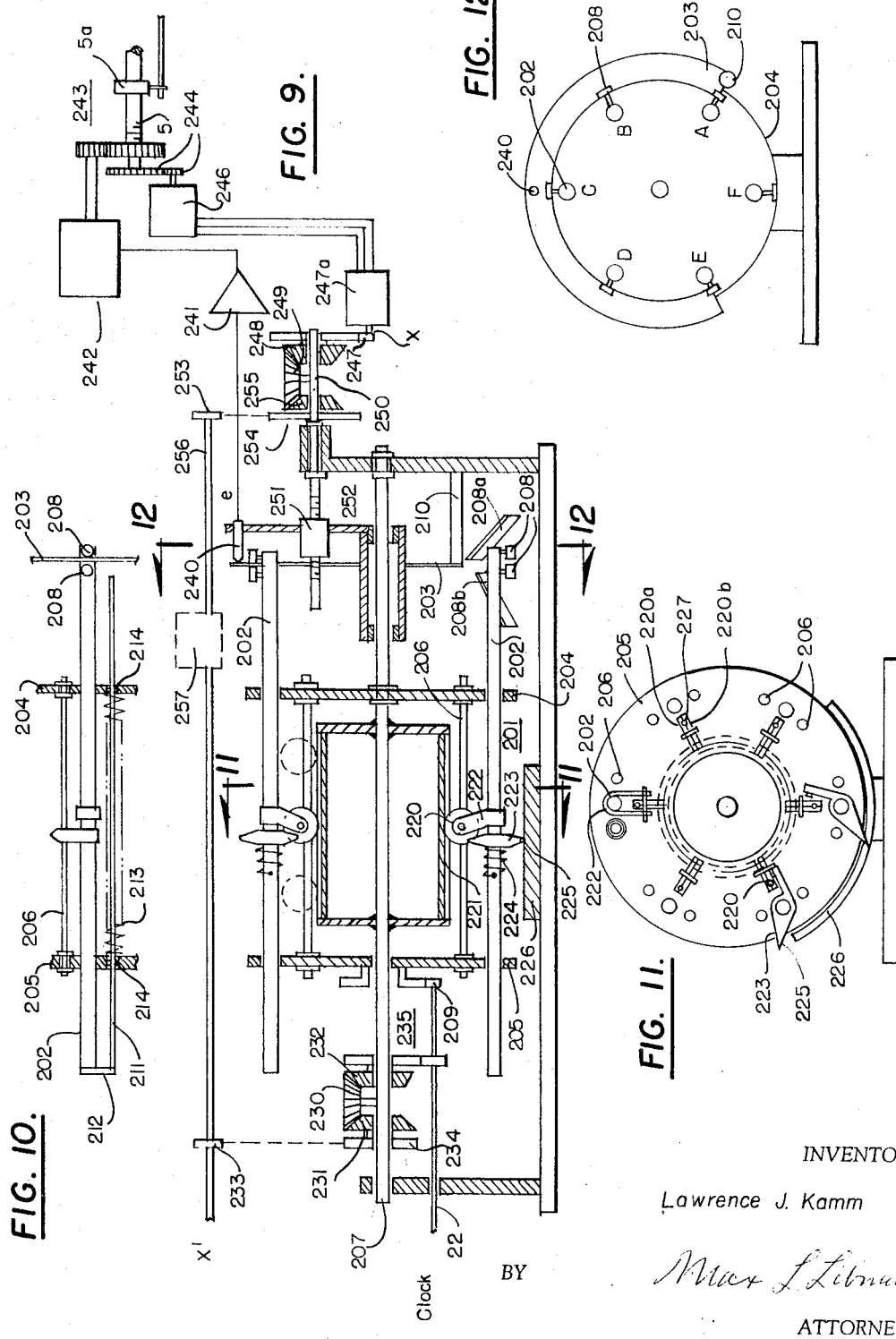

Jan. 10, 1967   L. J. KAMM   3,297,924
CONTINUOUS PATH NUMERICAL CONTROL SYSTEM WITH
MECHANICAL INTERPOLATION
Original Filed July 10, 1961   4 Sheets-Sheet 4

INVENTOR

Lawrence J. Kamm

BY

ATTORNEY

United States Patent Office 3,297,924
Patented Jan. 10, 1967

3,297,924
CONTINUOUS PATH NUMERICAL CONTROL SYSTEM WITH MECHANICAL INTERPOLATION
Lawrence J. Kamm, San Diego, Calif., assignor to Numerical Control Corporation, San Diego, Calif.
Continuation of application Ser. No. 123,396, July 10, 1961. This application Dec. 10, 1964, Ser. No. 419,277
10 Claims. (Cl. 318—18)

This application is a continuation of my co-pending application Serial No. 123,396, filed July 10, 1961, now abandoned for Continuous Path Numerical Control System. This invention relates to the generation of continuous curved displacements in machine tools, and in particular to such generation from numerical data defining such displacements. The invention is equally applicable to other types of machines requiring an element to be moved in a pre-defined curved path, such as drafting machines, etc.

Numerical control of machine tools is a major division of modern automation. The art is divided into "point-to-point" control, as in jig borers, and "continuous path" or contour control as in milling machines for die sinking, cam cutting and the like. Contour control for producing a curved contour of any desired shape is more difficult than point-to-point control; only a few concerns manufacture contour controllers today, and the available machines typically sell for about $50,000. The general practice of machine tool builders is to purchase a controller from another manufacturer and incorporate it in their own machines. Present controllers are gradually winning an increasing market despite their high cost and a number of serious technical disadvantages. These costs and disadvantages result from the fact that present commercially available controllers are essentially electronic digital computers directly coupled to machinery. This requires skilled electronic computer maintenance to be made available, as well as ordinary mechanical maintenance, since the skills required are entirely different, which greatly increases the cost of maintenance, and also renders the machines less acceptable to typical users, who are familiar with machinery but not with very complex electronic computing devices.

It is a major object of this invention to provide a mechanical contour control system which obviates most of the above difficulties and disadvantages, which is relatively inexpensive and highly reliable in performance, and which can be serviced and maintained by the same people who customarily maintain and service the machine tool which is controlled by the contour device.

Another object of this invention is to provide a mechanical contour device of relatively small size, which will control the displacement of a machine tool of pratically any size, and which therefore can be made both inexpensive and compact.

A further object of this invention is to provide a mechanical contour control device for machine tools which is limited in accuracy only by the accuracy of the machine tool.

It is also an object of the present invention to generate a smooth control signal to a machine tool drive, by smoothly interpolating point-to-point data with the complete absence of a polygonal surface finish such as is now sometimes found.

A still further object of this invention is to eliminate the use of a computer in preparing machine tapes for a contour control device. Most present machines require the use of an electronic digital computer for this purpose. The programming for the present device, in contrast, is so straightforward that a programmer for the device can be trained in a day. The device is thus particularly suitable for medium and small shops which could not afford the personnel required for present-day machines, even if they could afford the machine itself.

An important object of this invention is to provide a machine in which machine tool acceleration is controlled at all points along the contour by the programmer who can limit the acceleration to suit a particular machine. This eliminates the need for very stiff machines and servos required by most present controllers.

An additional object of this invention is to provide a tool offset computer which makes it unnecessary for the programmer to compute offset and which may also be adjusted to compensate for tool wear.

The above, and other objects, are achieved according to the invention by a digital tape input, which is preferably punched paper tape using pneumatic drive, although electric sensing of the perforations may alternatively be used, or even magnetic tape with conventional tape-sensing devices. The tape defines a series of points along the machine tool path. In the preferred embodiment the tape reader senses the punched holes by vacuum and the vacuum operates the control elements of the shaft position generator. A mechanical interpolator comprising a flexible cam surface which is continuously varied during operation is provided. This will be hereafter referred to as the "spline," which is preferably a flexible sheet of metal restrained at a series of successive points defined by the tape, and passing smoothly through these points. A follower controlled by the contour of the spline in turn determines the position of the machine tool in accordance with the interpolated curve, as will be shown in detail below. This follower controls one component of the motion of the tool or other device to be guided; for a two-dimensional contour, a second component at right angles to the first will be required; and for three-dimensional contouring an additional component of motion along the remaining axis must be provided. Briefly stated, the system defines a path by defining the coordinates of the succession of points along the path; it generates a succession of displacements corresponding to these coordinates; it interpolates between these displacements with a flexible spline; and it converts the continuous spline shapes into continuous machine motions rather than into a polygonal approximation of the desired curve.

The specific nature of the invention, as well as other objects and advantages thereof, will clearly appear from a description of a preferred embodiment as shown in the accompanying drawings, in which:

FIGURE 4 is a schematic view of the digital-to-analog converter and interpolating mechanism;

FIGURE 7 is a detail view showing the drive arm engaged with its associated wheel, together with a portion of the drive arm control mechanism;

FIGURE 8 is a developed view of the edge of a digital-to-analog converter wheel and its associated drive arm cams and actuators;

FIGURE 9 is a schematic sectional view of an alternative form of interpolator;

FIGURE 10 shows certain portions of FIGURE 9 in more detail;

FIGURE 11 is a view taken on line 11—11 of FIGURE 9;

FIGURE 12 is a view taken on line 12—12 of FIGURE 9;

Figure 1:
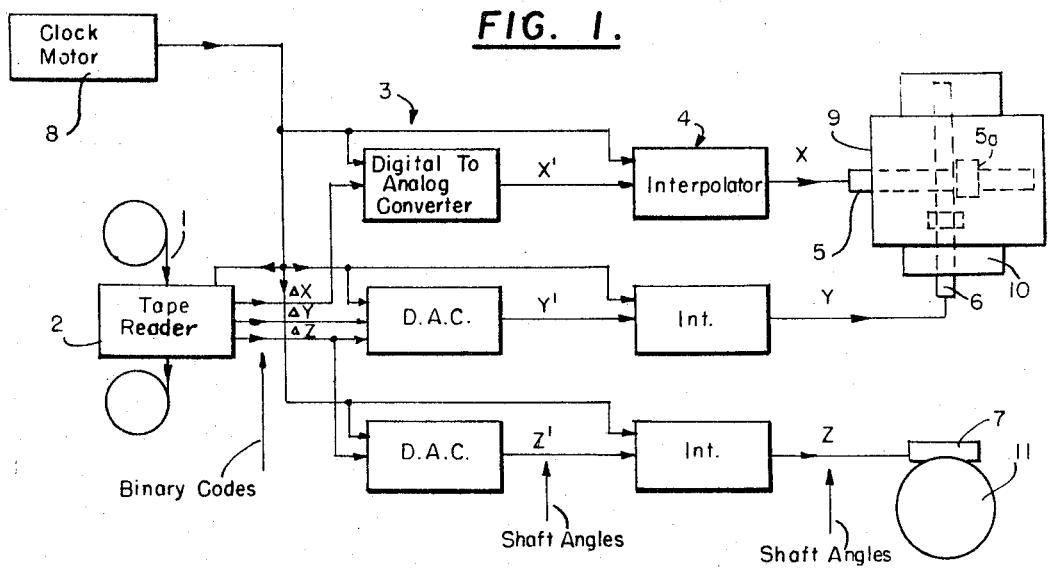
FIGURE 1 is a block diagram of the invention coupled to a machine tool, and showing the general principle of operation.

As above stated, the system defines the path by defining the coordinates of a succession of points along the path; it generates a succession of displacements corresponding to these coordinates; it interpolates between these displacements with flexible splines; and it converts the continuous spline shapes into continuous machine motions rather than into a polygon approximation of the desired curve.

A separate mechanism is provided for each axis of the machine with all mechanism synchronized. Each mechanism therefore generates a displacement of the form $x=f(t)$ where $x$ is the displacement and $t$ is time. For example, in a machine having two axes $x$ and $y$, one spline interpolates $x=f_1(t)$, a second spline interpolates $y=f_2(t)$, and the resulting curve of machine displacement is of the form $y=f_3(x)$. This parametric technique permits generation of sharp corners in $y=f_3(x)$ without producing sharp corners in the spline curves $x=f_1(t)$ and $y=f_2(t)$, as will be shown below.

Although this and subsequent descriptions refer to a two axis machine with axis designated $x$ and $y$, this reference is for simplicity of description only; the invention applies equally to machines having any number of axes with said axes having linear or angular displacement.

Means are provided in each interpolator whereby an output displacement of unlimited magnitude may be generated with a maximum spline displacement of small fixed magnitude. These means are independent of the scale factor relating spline displacement to machine displacement. Said means operate by a setback operation which continuously or intermittently displaces the spline towards its initial position. Said setback means displaces the spline but isolates the corresponding machine displacement from said spline displacement.

Means are provided whereby a spline of fixed length is effectively made endless. Thus an unlimited series of points on the machine path can be continuously and smoothly interpolated with a small number of spline positioners and a small spline.

Means are provided whereby the scale factor of the controller may be changed to accommodate the precision of the machine tool and of the work. For example, a .001 inch displacement of the spline may be made to cause a .001 inch, a .0001 inch, a .00001 inch or other displacement of the machine tool. Said means comprise change gears in the controller.

Means are provided at the inputs to the splines to generate displacement by a mechanism operable directly from punched tape. This mechanism may be made independent of electronic devices. Means are provided in said mechanism whereby its output is independent of backlash in its gearing.

Means are provided for parity check of the actual displacement generated.

Means are provided whereby the feed rate of the system may be easily varied over a wide range without modifying the tape, said means being a variable speed drive on the common clock (e.g., synchronizing) motor.

Means are provided whereby an adjustment may be manually added to the machine tool displacement to permit setting the zero position of the workpiece to the zero position of the controller.

Means are provided whereby the machine displacement may be driven by electric motor and lead screw, hydraulic motor and lead screw, hydraulic cylinder, or other actuator; and whereby machine displacement may be measured and fed back to the controller via lead screw displacement, optical grating pickoff, rack and pinion pickoff, or other means.

Means are provided to reverse the polarity of the input to each axis, whereby mirror image parts may be produced from a common tape.

A tool offset computer may be provided which senses the slopes of the individual splines, combines these quantities with a tool radius which is set in manually, and adds the proper tool offsets to the machine displacements.

A detailed description of the invention follows:

FIGURE 1 is a block diagram of the system. Perforated tape 1 is passed through tape reader 2. A digital code for each axis displacement is transmitted to the digital-to-analog converter 3 for that axis. The analog output of the converter, which changes in a stepwise manner (FIGURE 2) is transmitted to the interpolator 4 which smooths it and causes the machine tool displacement 5, 6, or 7 to follow it. Tape reader, digital-to-analog converters, and interpolators are all synchronized in the embodiment shown by being driven by a common motor 8 labeled "clock motor."

The machine tool displacements illustrated are a first slide 9, driven by lead screw 5, whose axis is designated X, and supported by cross slide 10, driven by lead screw 6, whose axis is designated Y, and a rotary table driven by worm 7 and worm gear 11 whose axis is designated Z.

Displacements are transmitted through the system in different forms in different places. In the punched tape, illustrated in FIGURE 3, increments of displacement are recorded in a binary code as punched holes. This code is preferably transmitted to the converters 3 as on or off states of vacuum, as illustrated in FIGURE 8 and described below. The code may also be transmitted electrically. The transmission paths are designated ΔX, ΔY and ΔZ, in FIGURE 1.

Figure 2:
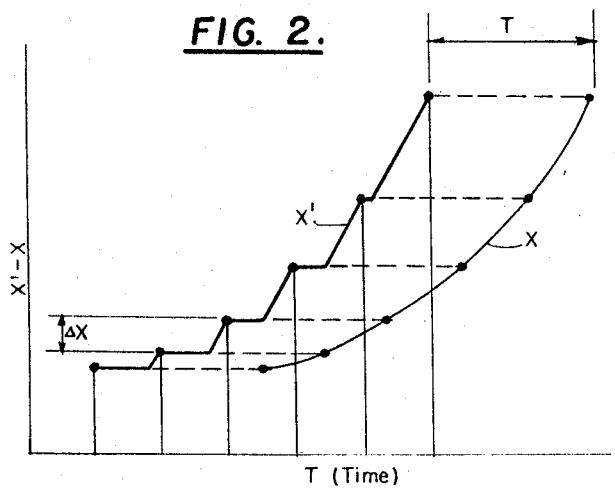
FIGURE 2 is a curve showing one component of the displacement, both as originally generated and as interpolated.

The digital-to-analog converter interprets the code and generates a shaft rotation output. The shaft angle is proportional to the algebraic sum of all the increments received, positive and negative. These shaft rotations are designated X′, Y′, and Z′. The converter does not smooth its output, which consequently moves in an intermittent fashion as illustrated in the graph in FIGURE 2. Each step in FIGURE 2 represents the passage of an increment ΔX, through the converter.

The interpolator receives the output of the converter and stores its different step values along a mechanical delay line. A flexible spline is fitted to the delay line to interpolate a smooth function between the points. FIGURE 2 shows the interpolator input X′ and output X as functions of time. T is the time delay between input and output of each increment.

Figure 3:
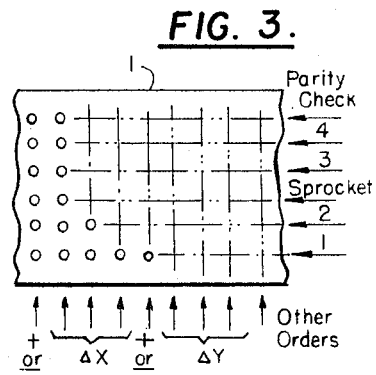
FIGURE 3 shows a typical section of punched tape bearing numerical data for use in the machine.

FIGURE 3 illustrates a block of data commanding one set of increments as punched in five hole Teletype tape. The first character represents the sign of the X increment ΔX, the second character represents the first significant figure of ΔX, and so on, as labelled in the figure. A typical increment might be +.803. The decimal point is established by the gear ratios in the machine and may be changed by change gear, as will appear in the description of FIGURE 4. The parity check and "other orders" have the same significance as now current in the art.

FIGURE 4 shows a more detailed embodiment of the system. Those parts comprising the digital-to-analog converter and the interpolator are enclosed by dot and dash boxes identified by numerals 3 and 4, respectively, as in FIGURE 1. Similarly, the tape and tape reader at the input end are again identified by numerals 1 and 2 and the lead screw of the machine displacement at the output end of the system is again identified by numeral 5. The shaft transmitting motion X′ from the converter to the interpolator is again designated X' and the shaft transmitting X motion between the interpolator and the machine displacement is again designated X. The clock motor is again identified by numeral 8.

FIGURE 4 shows portions of the mechanism in detail, while other portions are illustrated in greater detail in subsequent figures.

Clock motor 8 is driven by variable speed drive power supply 21 which is manually adjustable. The speed of motor 8 establishes the absolute speed of the control system and therefore the feed rate of the machine. Feed may be reduced to a complete stop and gradually increased again, all by varying the speed of clock motor 8.

Motor 8 drives tape reader 2 via shaft 22, gears 23 and shaft 24; converter 3 via gears 25 and shaft 26; and interpolator 4 via gears 27. Gears 28 and shaft 29 drive the Y and any other converters and interpolators.

Shaft 26 drives three sub-digital-to-analog converters via gear sets 30, 31 and 32. Each sub-converter converts one significant figure from digital to analog and the outputs of the three converters are proportioned and added in the subsequent gear train. Each sub-converter comprises an input shaft, e.g., 33 bearing a drive arm 34 and a driven converter wheel 35. Drive arm switching mechanism 36, shown only schematically in FIGURE 4, is detailed in FIGURES 7 and 8. Switching mechanisms 36 are actuated by vacuum power from pump 37 via air line 36a under selective control of the tape as illustrated in FIGURE 8.

If the decimal value of $\Delta X$ is represented as $\Delta.ABC$, where A, B and C are decimal digits between 0 and 9, then the angles through which the three converter wheels rotate in one revolution of drive arms are proportional to $\Delta.A$, $\Delta.B$, and $\Delta.C$, respectively, and their shafts are so labelled. (The means whereby tape reader 2, mechanisms 36, and drive arms 34 produce these rotational angles in wheels 35 will be described below with aid of FIGURES 6 through 8.)

Angle $\Delta.A$ is transmitted via differential spider gear 38 and differential side gear 39 to shaft 40 where it appears as angle $2(\Delta.A)$ because of the 2:1 gear ratio in the differential.

Angle $\Delta.B$ is transmitted via spider gear 41 and side gear 42 to shaft 43 and gear 44 where it appears as angle $2(\Delta.B)$. This is transmitted via gear 45, side gear 46, spider gear 38, and side gear 39 to shaft 40 where it adds to angle $2(\Delta.A)$. The gear ratio between gears 44 and 45 is 1:10. Therefore, the angle added to shaft 40 is $(\frac{1}{10}) (2) (\Delta.B)$ or $(2) (\Delta.0B)$.

Similarly, angle $\Delta \cdot C$ is transmitted by gears 47, 48, side gear 49, spider gear 41, and side gear 42 to shaft 43 where it adds to the angle produced by $\Delta \cdot B$. Since the ratio of gears 47 to 48 is 1:5, the motion contributed by $\Delta \cdot C$ to shaft 43 is $(\frac{1}{5}) (\Delta \cdot C)$ which equals $(2)(\frac{1}{10}) (\Delta \cdot C)$ or $(2)(\Delta \cdot 0C)$. This displacement is transmitted along with $(2)(\Delta \cdot B)$ and appears at shaft 40 as $(2) (\Delta \cdot 00C)$.

Thus the sum of all three angles, suitably scale factored, appears on shaft 40, the total angle being proportional to $(\Delta \cdot ABC)$. The rotation of converter wheels 35 is unidirectional. They rotate an increment in the same direction for each $\Delta X$. Therefore, shaft 40 rotates through an angle which represents the accumulation of all $\Delta X$ increments which have passed through the machine.

If all such increments had been positive, the angle of shaft 40 would be X. However, in practice, some increments will be positive and some will be negative. The sign of the increment is introduced by clutches 50 and 51 and by gears 52, 53, 54, 55 and 56.

If the sign of $\Delta X$ is +, the corresponding hole in the tape causes clutch 50 to be activated and clutch 51 to be deactivated. Motion of shaft 40 is transmitted directly to the output shaft X' and gears 52–56 are driven but merely idle. If the sign of $\Delta X$ is —, clutch 50 is de-activated and clutch 51 is activated. The increment of motion of shaft 40 is transmitted via gears 52 and 53, clutch 51, and gears 56, 55 and 54, and turns shaft X' in the opposite direction. Thus shaft X' accumulates each increment X with the proper sign and therefore its angle does represent the quantity X'.

Since the gear train between converter wheel 35 and shaft 40 always runs in the same direction and pressure between every pair of meshed gears is always the same direction, backlash in this gear train never occurs. Clutches 50 and 51 may be made toothed clutches so that even theoretically no error is introduced during sign reversal. However, since sign reversals are infrequent in practical machining, said clutches may also be of the smooth type. In either case, the clutch mechanism is of the locking type which does not release until a reverse signal appears and then releases in a close-before-release sequence.

Clutches 50 and 51 receive their operating signal through reversing device 57. If electrical signals are used to actuate the clutches, device 57 is a double pole-double throw reversing switch. If pneumatic signals directly from pneumatic tape reader 2 are used, device 57 is the four-way valve analog of such a switch.

Counter 58 may be coupled to shaft X' with gears 59 to indicate the magnitude of X' to the operator.

Reverse motion of each converter wheel is prevented by backstopping clutches 60, e.g., by a suitable pawl mechanism.

Figure 6:
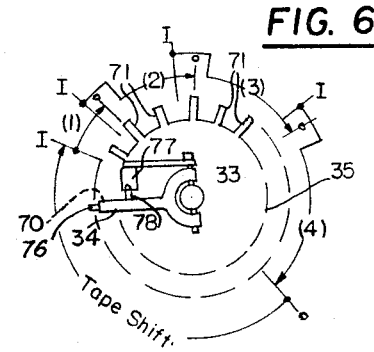
FIGURE 6 is a face view of one of the digital-to-analog converter wheels and its associated drive arm.

FIGURES 6, 7 and 8 show converter drive arms 34, wheels 35, and switching mechanism 36 in greater detail.

In FIGURE 6, arm 34 is pivoted on input shaft 33. Arm 34 has finger 70 which meshes between the teeth 71 of wheel 35 when arm 34 is pivoted towards said wheel and clears said teeth when said arm is pivoted away from said wheel.

FIGURE 7 shows a detail view of the finger end of arm 34 and FIGURE 8 shows a developed view of the teeth 71 on the periphery of wheel 35.

The switching mechanism 36 (FIGURE 8) comprises a set of plungers 72(1) to 72(4) sliding in cylinders 73 and bearing cams 74 and 75. As drive arm 34 rotates past plungers 72, cams 74 or 75 interfere with cam follower 76 and pivot arm 34 towards and away from wheel 35, respectively. Each plunger 72 is urged outward by its spring 98. When vacuum is extended to cylinder 73 by the tape reader 2, as illustrated in FIGURE 8 and described below, the vacuum overcomes the spring and draws the plunger inward. Both motions are terminated by travel stops.

If a plunger 72 is in the outward (de-energized) position and the arm 34 passes it with its finger engaged in the wheel teeth, then cam 75 strikes cam follower 76 and pivots the arm out of the engagement position. If a plunger is in the inward (energized) position and the arm 34 passes it with its finger disengaged from the wheel teeth, then cam 74 strikes cam follower 76 and pivots the arm into the engagement position.

Shaft 33 supports permanent magnet 77 which acts as a detent to arm 34. Armature lug 78 on arm 34 is attracted to one magnetic pole in finger-engaged position and to the other pole in the finger disengaged position. Alternately to the permanent magnet, other forms of detent or toggle may be used.

A displacement of one tooth pitch on the converter wheel corresponds to an increment of $\Delta \cdot 1$. The plungers control the total increment generated by one revolution of the drive arm by switching the drive arm into and out of engagement during the course of the revolution. If plunger 72(3) is in (energized) and the other plungers are out, the finger 70 is inserted between tooth positions 79 and 80, strikes the tooth in position 80 and carries it to position 83, where cam 75(4) causes disengagement. Thus, the wheel is rotated three tooth pitches.

Similarly, if only plunger 72(2) were engaged and the others were out, the finger would be engaged at its position and the engaged tooth would be carried two tooth pitches to position 79. Similarly, plunger 72(1) controls a one-tooth pitch increment and plunger 72(4) controls a four-tooth pitch increment. By combinations of these increments, any increment from 0 to 10 may be produced, i.e., by energizing any one or more plungers simultaneously.

FIGURE 6 shows the engagement arc controlled by each plunger. The arcs overlap so that if two adjacent plungers are energized, there is no transient disengagement-re-engagement at a boundary. Furthermore, the same overlap causes finger insertion to occur approximately midway between teeth so that there is a wide tolerance on the entry point. In FIGURE 6 the engagement point of each arc is marked I (in) and the disengagement point is marked O (out).

More than the minimum number of teeth are provided on wheel 35 so that the full displacement of the drive arm is accomplished in a portion of its revolution. The remainder of the revolution provides time for the tape to be shifted in the tape reader.

Fixed plunger 91 has only a disengagement cam 75 because the rotation beyond this point is the tape shift part of the cycle. Therefore, plunger 72(1) needs only its engagement cam 74, since the drive arm will never approach it in the engaged position. A set of contacts 92 may be provided for operation by each plunger for parity check.

The 1, 2, 3, 4 code described uses the smallest possible number of teeth in the wheel to effect the range of increments from 0 to 10. A 1, 2, 3, 3 code may be used with a range of 0 to 9, but then the largest $\Delta X$ would be .999; on the other hand, it makes programming easier to be able to call for increments of an even 1.000.

A three digit converter has been described. In a similar manner a converter can be made with two, four or other number of digits.

FIGURE 8 also illustrates the control of a plunger 72 by the perforated tape 1. The vacuum pump 37 is coupled to tape reader 2, as shown in FIGURE 4. The vacuum is conducted to a separate duct 94(1) to 94(4) for each code hole position 95 in sensing block 96. A restriction 97 is placed between the vacuum pump and the remainder of the duct in each duch 94. If no hole appears in the tape, the vacuum extends throughout the duct and into cylinder 73, permitting atmospheric pressure on plunger 72 to overcome the force of spring 98 and force the plunger into the cylinder, as shown for 73(3). If a hole 99 appears in the tape, air rushes into duct 94 through said hole and reduces the vacuum in cylinder 73 so that spring 98 overcomes said reduced vacuum and holds plunger 72 in the extended position illustrated.

Figure 5:
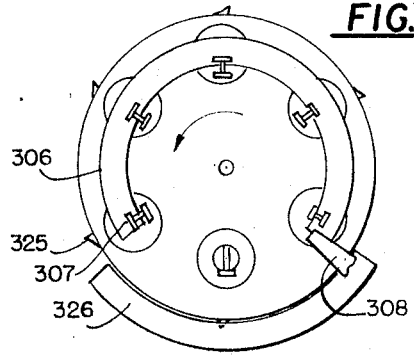
FIGURE 5 is a face view of the interpolating spline.

A first species of interpolator 4 is illustrated in FIGURES 4 and 5. In FIGURE 4 the displacement input is designated X', the clock input is shaft 22, an error signal output is designated $e$, and the feedback displacement from the machine is designated X.

A second species of interpolator, FIGURES 9–12, will now be described. The interpolator comprises a rotating turret 201 having a plurality of displacement rods 202, means for sequentially shifting said rods, an interpolating spline 203, and output servomechanism slaved to the displacement of said spline and coupled to a controlled machine displacement, and setback means whereby cumulative displacement of said rods is removed. The turret comprises discs 204 and 205 joined by the rods 206 and supported on main shaft 207 for rotation relative thereto. Displacement rods 202 are supported by said discs, through which they are free to slide. At the end of each of said rods is a spline guide shown as a pair of rollers 208.

Spline 203 is deformed into a helix by said displacement rods, said helix in general not having a uniform slope. Said turret of displacement rods thus comprises said mechanical delay line and said spline thus comprises said interpolator, as will be shown in detail below.

Turret 201 is rotated by clock shaft 22 via gears 209. Spline 203 is pivotally supported at one end by bracket 210 (FIGURES 9 and 12) so that it is constrained against motion other than changing the form of its helix, and so that at the point of support by bracket 210 it is also constrained against axial motion. It is free to rotate about a radial line through the point of support. Each displacement rod is restored to the point of support, or zero, position of the spline before its spline guide 208 engages the supported end of the spline at 210, and undergoes a controlled displacement during the course of its revolution with the turret.

The restoring means illustrated is a bungee comprising zeroing rod 211 (FIGURE 10) coupled to displacement rod 202 by strap 212, spring 213 and spring stops 214 on zeroing rod 211. Said spring has a free length greater than the distance between discs 204 and 205 but is compressed into the space between said discs. Zeroing rod 211 is supported by holes in said discs and is free to slide through said holes. Said spring stops are projections on the zeroing rod and pass freely through extensions of said holes in said discs. The space between said stops is approximately equal to the space between said discs. Thus, if the displacement rod and zeroing rod are displaced from the zero position, one end of spring 213 will bear against a disc and the other end will bear against a spring stop. The resultant force on the zeroing rod urges said rod back to the zero position. Furthermore, this zeroing effect is the same for both directions of displacement away from zero. Alternatively, a simple guide cam arrangement consisting of two arcuate guide cams 208a, 208b could be used to guide rollers 208 to spline 203.

Motion of displacement rods 202, other than restoration to zero, is effected by worm gears 220 and worm cylinder 221. Said worm cylinder has a helical thread meshed with the teeth of said worm gears. Said worm cylinder is fixed to main shaft 207. Each worm gear 220 is pivoted in bracket 222 on displacement rod 202. Brake lever 223 is urged by spring 224 to press against gear 220, thereby preventing rotation of said gear. During a portion of the turret rotation, end 225 of lever 223 is deflected by cam 226, freeing gear 220 to rotate. When gear 220 is thus freed, said restoring means is enabled to perform its function, gear 220 rolling along worm cylinder 221. Rotation of said worm cylinder during this freed state of the said gear rotates said gear but produces no displacement of rod 202.

When gear 220 is prevented from rotating by brake lever 223, those of its teeth in mesh with the thread of worm cylinder 221 act as a nut and said thread acts as a screw. Rotation of cylinder 221 with main shaft 207 then moves displacement rod 202 and similarly moves all other rods that are not freed. Gears 220 are preferably of the conventional anti-backlash type, being divided into two adjacent portions 220a and 220b and provided with spring 227 urging relative rotation between said portions.

Main shaft 207 is rotated by differential spider gear 230 mounted on said shaft. Said spider gear is driven by the differential rotation of side gears 231 and 232. Side gear 231 is driven by the X' input shaft via gears 233 and 234. Side gear 232 is driven by clock shaft 22 via gears 235. The gear ratios are such that the rotation of main shaft 207 relative to turret 201 is proportional to the rotation of X' alone and is independent of the rotation of shaft 22. This is because the rotation of clock shaft 22 is fed equally to said turret via gears 209 and to said main shaft via gears 235, 232 and 230.

The output servomechanism comprises a forward path and a feedback path. Said forward path comprises spline sensing element 240 whose output is designated $e$, amplifier 241 whose input is $e$ and whose output drives machine tool displacement motor 242, and gears 243 coupling said motor to X axis lead screw 5. Said feedback path comprises gears 244 coupling lead screw 5 to transducer 246, such as a synchro transmitter, reverse transducer 247a, such as a synchro receiver, whose output is a shaft rotation designated X, a gear train comprising gears 247, differential side gear 248, spider gear 249 mounted on lead screw 250, and nut 251 on sensing element carriage 252.

The displacement of shaft X' is added to the feed-back displacement via gears 253, 254, side gears 255, and spider gear 249. Gear 253 on shaft 256 has the same displacement magnitude as shaft X' itself. Manual displacement means 257, shown in detail in FIGURE 4, transmits the motion of X' plus such manual displacement as is inserted.

Rod displacement is as follows: Each rod 202 is restored to zero position during the deflection of brake lever 223 by cam 226. The cam releases the lever immediately after rod guide 208 engages the spline. When the lever is released, the worm gear 220 is locked to its bracket 222 and transmits the displacements of the thread on worm cylinder 221 to all rods 202. These displacements are the stepwise displacements of X' which occur during the code conversion portion of the clock cycle and are quiescent during the tape shift portion (FIGURE 6). The phase relationship between converter 3 and interpolator 4 is such that displacement rods 202 engage the start of the spline during the quiescent tape shift portion of the clock cycle. The converter and interpolator are geared to the clock shaft 22 in this phase relationship. The relative gear ratios are such that the interpolator turns one rod pitch while the converter turns through one complete cycle.

Figure 13:
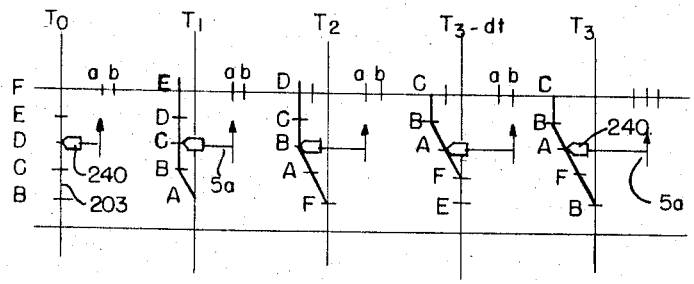
FIGURE 13 is a schematic diagram used in explaining the operation of the interpolator.

In order to more fully explain the above operation, reference is now made to FIGURE 13. FIGURE 13 represents a developed view of spline 208 at various successive time intervals, to show the manner in which the spline configuration varies as additional digital values are fed into the device. It will be assumed that initially at $T_0$ no data have been fed into the machine; the spline sensor 240 is therefore in the zero position; all of the rods 202 are in their respective center positions; and the spline therefore has no axial curvature and lies entirely in a plane parallel to the end of drum 201. The tool carrier 5a (FIGURE 9) has the initial position $a$ which corresponds to the starting position, and also corresponds to the initial position of spline sensor 240. It is assumed that at time $T_1$, $T_2$, $T_3$, etc., successive equal digital units of information will be fed into the machine as above described, of a magnitude sufficient so that each such digital unit will eventually cause the tool to move to the right a unit of distance corresponding to $a$–$b$, $b$–$c$, etc. In other words, the tool is to be moved to the right with uniform motion.

At time $T_1$, shaft X' therefore feeds the first bit of information, as described in connection with FIGURE 4, to the two differentials 231–230–232 and 255–249–248 (FIGURE 9). This causes all of the rods 202 (which will be represented by points A–F, respectively) except rods A and F, which are free since they are in the lower section where their brakes are released by the cam, to move one unit to the left. Rod A is just about to engage the spline at 210, but has not yet done so, and since point 210 is fixed, the spline will flex between points B and A as shown at $T_1$, while the remaining portions B–E still lie in a substantially straight line, i.e., a common plane, because all of the rods have been moved simultaneously to the left, as above described.

While this has been going on, the digital data on shaft X' is also fed through differential 255 to spline sensor 240, as above described, and the spline sensor therefore moves to the left together with rod C, which is at this time directly opposite the spline sensor. Since there is no relative motion between the sensor 240 and the spline 203 due to the above-described action, the tool holder 5a is not affected by this operation and remains in its original position.

At the time $T_2$, the same operation is repeated, and rods B, C and D move back still another unit so that the spline now bends at point B to a uniform slope from point B to point F. It will be understood that point E is now "in limbo," i.e., in the released condition due to entering the cam portion (cam 226) of its revolution, and therefore is not engaged with the spline. It is therefore not shown at time $T_2$. At this time the spline sensor has moved to the left a second unit, but this motion was derived from shaft X' through differential 255, and therefore the tool holder 5a has not moved, and the tool has not begun its operation.

During the above-described time intervals, it will be understood that points A–F, representing the ends of rods 202, have been moving upward in these diagrams with uniform motion, derived from the clock through shaft 22 (FIGURE 9). It should be emphasized that the spline itself does not actually move, but since the pair of rollers 208 at each point A–F is moving along the spline, the spline configuration or "wave" changes as though the spline itself were moving upward in FIGURE 13. Therefore, from time $T_2$ to immediately preceding time $T_3$, which we will designated as $T-dt$, point B moves nearly to the position previously occupied by point C, while point A moves upward a corresponding distance. Since the spline sensor 240 is now at a curved portion of the spline, which it must follow, the spline sensor 240 therefore now moves back substantially one unit of displacement (i.e., to the right) as will be evident from comparison of times $T_2$ and $T_3-dt$. This movement of sensor 240 is, of course, followed through the servomechanism by tool holder 5a, which therefore correspondingly moves one unit to the right. The tool holder now moves a distance corresponding to the data which was put into it two time units previously. Immediately thereafter, time interval $T_3$ is reached, when the additional unit of digital data is put in via shaft X', in the same manner as above described. This again causes the entire assembly of spline and spline follower to move one additional unit to the left, whereby the spline follower essentially recovers the ground which it lost in the preceding unit of time, but this, of course, does not affect the tool holder 5a, since this additional motion is obtained via differential 255. Since the continuous clock motion of the spline is not in the least affected by the above procedure, the entire spline rod assembly A–F continues to move upward in FIGURE 13 with uniform velocity, and the spline follower 240 encountering a continuation of the same slope which previously caused it to move to the right, continues to move to the right until time $T_4-dt$, at which time the tool holder will have reached a position corresponding to the second unit of information put into the machine.

Assuming that uniform increments of digital data are fed into the machine from this time on, it will be apparent that by repetition of the above-described action the tool holder will move smoothly and continuously to the right, while the spline follower 240 moves uniformly to the right due to its following of the spline surface, and at intervals, as the information is fed into the machine, it moves quickly to the left by the same net amount.

While the spline has been shown as sharply bent in the explanatory figures, it will be understood that it actually assumes a smooth curvature representing the interpolation of the data which are fed into the machine. The example of uniform motion of tool holder was selected for simplicity, but it will be apparent that the successive intervals of data fed into the machine may be greater or less, and also may be in either direction, the principle of operation being exactly the same as described above.

The combination of displacements disclosed cause the X motion of the machine tool to be the interpolated motion of the X' shaft with a fixed time delay, as shown in FIGURE 2.

That this is indeed the case may be more easily understood as follows: Consider X' to be the function of time illustrated in FIGURE 2. At the time the first displacement rod brake lever is released by cam 226 and the brake becomes set by its spring, let the value of X' be designated $X'_1$. Similarly, at the time the $n$th rod brake is set, the value of X' is $X'_n$. Therefore, the displacement of the $n$th rod is $(X'_1-X'_n)$ until the brake is again released. (At the instant the brake is set, X' equals $X'_n$ by definition, and subsequent displacements due to increments in X' add up to $(X'-X'_n)$.) If X is the actual servomechanism feedback, the question is whether X is the interpolated value of X', as desired.

If spline sensor 240 is two displacement bar spaces from the brake resetting point, then a displacement rod at the sensor position is the $(n-2)$ rod, the $n$th rod being at the brake setting point. The displacement of the $(n-2)$ rod is $(X'-X'_{n-2})$. This is also the displacement of the spline sensor 240, since the servomechanism continually makes it so.

The spline displacement is due to the sum of the two inputs to the differential comprising gears 255, 249 and 248. One of these inputs is X' via gears 253 and 254 and the other is X via gears 247. Therefore, this displacement is $$X'-X'_{n-2}=X'+X$$

Therefore, $X=X'_{n-2}$, the reversed polarity being correctable in the gearing between shaft 256 and gear 254 or elsewhere. This is precisely the time delay relationship indicated by curves X and X' in FIGURE 2, and is why the turret of displacement rods has been called a mechanical delay line.

The intermittent motion of X' in response to its increments introduces no appreciable transients into the servomechanism. This is because an X' displacement is simultaneously fed to the displacement rods 202 and to the spline tracer lead screw 250 simultaneously by direct gearing, so there is never a large signal generated requiring a large servo effort to keep down the error.

Since the spline shape is smooth, since X is at the desired value of $(X'-X'_{n-2})$ each time a displacement rod passes the tracer, and since there are no transients due to introduction of X' increments, it follows that X is also at the desired interpolated value at all times.

The number of displacement rods illustrated in FIGURES 4 and 14-16 is six, which is a convenient number for achieving good interpolation; but the number of rods may also be any other number greater than one.

Since the final displacement of the $n$th rod 202 is $(X'_{n+m}-X'_n)$, where $m$ is the number of rods in the braked portion of the turret, then the maximum displacement of any rod is $m$ times the maximum X' increment, regardless of the total accumulated magnitude of X' and X. Thus a controller with a small maximum displacement can control a machine tool with an unlimited displacement.

In FIGURES 4 and 5, there is a turret comprising disc 301 on main shaft 302, carrying displacement rods 303, each threaded into a sleeve nut 304. Nut 304 is supported on bearings in disc 301 and is free to rotate, but is not free to translate, i.e., move axially with respect to the disc. Rod 303 is keyed to disc 301 by key 305 so that it is free to translate when nut 304 turns, but is not free to rotate with respect to disc 301. Spline 306 is deformed by spline guide rollers 307 at the ends of rods 303 and is supported at one end by fixed bracket 308 (FIGURE 5). The spline following servomechanism is the same as in FIGURE 14.

Displacement rod motion is the same as in the first species in FIGURE 10, but the mechanism is different. Each nut 304 is driven by differential spider gear 309 mounted on it. Two inputs to spider gear 309 provide the X' motion and the restoring to zero motion.

The X' motion is transmitted in order by gears 310, 311, side gear 312, spider gear 313, gears 314, 315, 316, 317, 318, side gear 319, and spider gear 309. Turret rotation is cancelled by gears 320, side gear 321 and spider gear 313.

The restoring motion is a second X' displacement transmitted by gears 322 and 323 to a storage spring 324. When brake lever 325 is deflected by cam 326, spring 324 is released and transmits the X' displacement to side gear 327. Since the motion of side gear 327 when the brake is released in equal and opposite to the motion of side gear 319 which had occurred previously, the displacement rod is restored to zero.

The scale factor of spline 203 or 306 is the ratio of its displacement to the corresponding displacement of the machine tool. This ratio may be changed by changing the ratio of gears 247 in FIGURE 10 or gears 328 in FIGURE 4. These gears are in the feedback paths of their respective servomechanism and therefore control the ratio of machine tool displacement to feedback displacement. Said gears may be mounted in such a manner that they may be easily removed to permit changing the scale factor. For example, a scale factor of 1:1 may be desirable for most machining work with tolerances of the magnitude of ±.001 inch and with maximum increments of one inch. For high precision work, a change in scale factor to 10:1 (a displacement of .001 inch on the spline corresponds to a displacement of .0001 inch on the machine tools) could be made in exchange for limiting the maximum increment of 1/10th inch. This example is in terms of the arbitrary number of three significant figures illustrated in the converter 3 of FIGURE 4. The controller can be made with any number of significant figures in the converter and with any scale factor.

Figure 14:
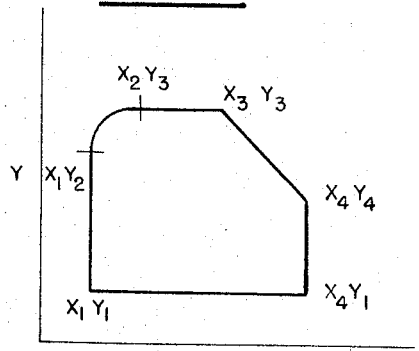
FIGURE 14 shows a typical path generated by the machine tool.
Figure 16:
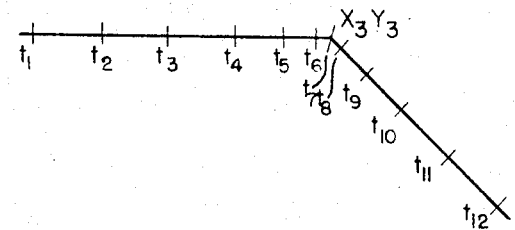
FIGURE 16 is an enlarged portion of the path in FIGURE 14.
Figure 15:
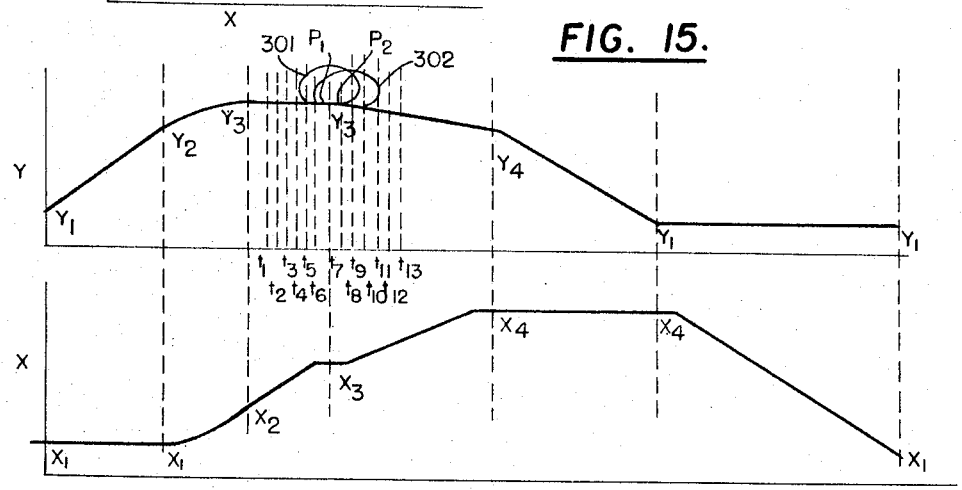
FIGURE 15 illustrates the two components of the displacement as functions of time.

FIGURES 14-16 illustrate the programming system of the controller. They show how the system uses varying point spacing to control system dynamics.

FIGURE 14 shows a typical machine path to be generated; FIGURE 15 shows the displacement of each axis as a function of time (i.e., of clock shaft motion). FIGURE 16 shows an enlarged view of a portion of the path of FIGURE 14.

Assuming a uniform feed rate, the first portion of the path from $X_1$, $Y_1$ comprises a uniform rate of increase of Y and a constant value of X. The circle quadrant portion from $X_1$, $Y_2$ to $X_2$, $Y_3$ comprises a gradual deceleration of Y and a gradual acceleration of X. The straight portion from $X_2$, $Y_3$ to $X_3$, $Y_3$ comprises a uniform rate of rise of X and a constant value of Y.

At the corner $X_3$, $Y_3$ there is a discontinuity in the slope of the path. If the program and controller attempted to turn the corner at the same fixed feed rate, two faults would develop. In the controller there would have to be a sharp corner in each of the splines, which is unobtainable, and the machine tool would have to undergo infinite accelerations on both axes, which is impossible. Therefore, the program is made as shown in FIGURE 16.

Successive values of X' and Y' are chosen at successive times $T_1$, $T_2$, etc. As $X_3$, $Y_3$ is approached, the spacing between these values is made smaller and smaller. In the controller this flattens the spline slopes toward zero; in the machine tool it decelerates the motion toward zero. After the corner $X_3$, $Y_3$ has been reached at time $T_7$, successive increments are made larger until the machine tool is moving at full feed rate on the way to $X_4$, $Y_4$.

In FIGURE 15, loop 301 illustrates the fit of the Y spline to the Y function of time just before the corner is reached, when the spline tracer is at point $P_1$ on the spline, and loop 302 illustrates the spline just after the corner is passed, when the tracer is at $P_2$.

For an absolutely sharp corner, the exact corner values of X' and Y' are repeated once or twice (i.e., their increments are made zero) to bring the machine to a complete stop before accelerating on the new slope.

In programming straight lines and flat curves, there are the dual and consistent practice that the increments be large because large increments are adequate to define the curve and, second, large increments cause large feed rates which are permitted by machine dynamics on flat curves.

Conversely, in programming sharp curves and corners, there are the dual and consistent practice that the increments be small because small increments are necessary to define the curve and small increments cause small feed rates which are necessary for machine dynamics on sharp curves.

It will be apparent that the embodiments shown are only exemplary and that various modifications can be made in construction and arrangement within the scope of the invention as defined in the appended claims.

I claim:

1. A continuous path numerical control system comprising in combination: data storage means; data storage sensing means associated with said data storage means for receiving data from said storage means and for providing data output, including: a driving element; at least one axially driven means; means for imparting axial movement to the axially driven means from said data sensing means, including: digital to analog converter means associated with and receiving the data output of said storage sensing means and converting said output to a mechanical displacement, said converter including: mechanically driven displacement means responsive to said output; a differential including a first driving element, a second driving element and a driven element therebetween, said first mentioned driving element being connected with the mechanical displacing means of the converter; an interpolator including: a flexible spline; a rotatable turret; a plurality of displacement members rotated by the turret and associated with the spline for imparting flexing movement to the spline; a rotatable element driven by the driven element of the differential for imparting movement to the displacement members; means cooperating with the spline for sensing displacement of the spline; and servomechanism responsive to said spline sensing means for controlling the output of said axially driven means.

2. A system as defined in claim 1, characterized in that said means for sensing displacement of the spline is moved by the spline, and further characterized to include: additional means for controlling movement of said spline sensing means including: a differential including two driving elements, and a driven element therebetween, said additional means being responsive to the movement of the driven element of the last mentioned differential, one of said driving elements of the last mentioned differential being driven by the servomechanism, and the other driving element of the last mentioned differential being synchronized with the movement of the mechanically driven displacement means of the converter.

3. In a control system, in combination: an axially driven means; servomechanism for imparting axial movement to said axially driven means; means for controlling the servomechanism, including: digital to analog converter means including: mechanical driven displacement means; means for conveying data to said last mentioned means; an interpolator mechanism including: screw means; displacement members; rolling nuts connected with the displacement members and meshing with the screw means; a flexible spline; means connecting the displacement members with the spline and for cyclically, progressively locking and unlocking the rolling nuts with the screw means, including: a turret carrying said displacement members; means for rotating said turret; a differential having two driving elements and a driven element, one of said driving elements being driven in synchronism with the turret rotating means, the other of said driving elements being connected with the mechanical displacement means of the converter, the driven element being connected with the screw means; spline movement sensing means actuated by movement of the spline for controlling the servomechanism; means for imparting additional movement to the spline sensing means including: a differential having two driving elements and a driven element, one of said driving elements being driven in synchronism with the mechanical displacement means of the converter, the other of said driving elements being driven in synchronism with the servomechanism, and the driven element being connected in driving relationship with the spline sensing means.

4. A control system as defined in claim 3, characterized to include: means operable when the rolling nuts are unlocked for restoring the displacement members to a predetermined position with respect to the screw.

5. A machine tool control for effecting substantially continuous machine tool movement in response to successive increments of digital data comprising: a source of programmed data defining successive digital points; means for translating said data into successive mechanical displacements representing the spacing between said points; means for transforming said successive mechanical displacements into a smoothly changing, continuous pattern; means following said pattern to effect substantially continuous movement of the machine tool along a coordinate axis; and set-back means for periodically cancelling the cumulative effect of said mechanical displacements on said transforming means beyond said following means without effecting a comparable movement of the machine tool, whereby said transforming means controls the local changes of the position of the machine tool along said coordinate axis independent of the cumulative movement of the machine tool along said axis.

6. A machine tool control for effecting substantially continuous machine tool movement in response to successive increments of digital data comprising: a source of programmed data defining successive digital points; means for translating said data into successive mechanical displacements representing the spacing between said points; an interpolator for transforming said successive mechanical displacements into a smoothly changing, continuous pattern, said interpolator including a flexible member movable transversely to supply a continuous, variable surface; a sensing means following said surface to effect substantially continuous movement of said machine tool; means for effecting simultaneous movements of said member and sensing means transversely of said surface in response to said successive mechanical displacements and without moving said machine tool by said simultaneous movements of said member and sensing means; means for moving said member surface independently of said sensing means to effect tool-moving follow-up movement of the sensing means; and set-back means for periodically cancelling the cumulative effect of said mechanical displacements on said flexible member without effecting a comparable movement of the machine tool, whereby said interpolator controls the local changes of the position of the machine tool independent of the cumulative movement of the machine tool.

7. The machine tool control defined in claim 6, including: a plurality of displaceable means movable transversely of said flexible member to locate the position thereof; means for effecting relative longitudinal movement between said displaceable means and said flexible surfaces; and means for moving said displaceable means transversely in an algebraically cumulative manner in accordance with said successive mechanical displacements, said set-back means operating at a predetermined point on said flexible member for disengaging said displaceable means therefrom and returning them to their null position for re-engagement with said flexible member at a null position thereof, said set-back having no effect upon the position of said machine tool, whereby a flexible member having a relatively small transverse movement will operate to control local movements of the machine tool along a coordinate axis of unlimited length.

8. The machine tool control defined in claim 7 in which the sensing means is located at a fixed position spaced from the null position of said flexible member and said flexible member null position is periodically extended therealong toward the sensing means to effect tool-moving follow-up movement of the sensing means.

9. A machine tool control for effecting substantially continuous machine tool movement in response to successive increments of digital data comprising: a source of programmed data defining successive digital points along a coordinate axis; means for translating said data into successive mechanical displacements representing the spacings between said points along said coordinate axis; means for transforming successive mechanical displacements into a smooth, continuous pattern surface; means responsive to movement of said sensing means without complementary movement of said pattern surface by said mechanical displacements for effecting substantially continuous movement of the machine tool along said coordinate axis; and set-back means for periodically cancelling the effect of said mechanical displacements on said transforming means pattern surface outside of the zone in which said sensing means is following said pattern surface, said set-back means effecting said cancellation without effecting movement of the machine tool whereby said transforming means pattern surface effects local changes of the position of the machine tool along said coordinate axis independent of the cumulative movement of the machine tool along said axis.

10. A machine tool control as defined in claim 9 including: a second, substantially identical control responsive to a source of programmed data defining successive digital points along a second coordinate axis transverse to the first coordinate axis for effecting continuous movement of the machine tool along said second coordinate axis; and means for simultaneously moving said machine tool along both said coordinate axes in accordance with the sources of programmed data for the separate axes, individually translated and transformed by the individual control means.

References Cited by the Examiner

UNITED STATES PATENTS

| | | | |
|---|---|---|---|
| 2,723,845 | 11/1955 | Przblyski et al. | |
| 2,770,975 | 11/1956 | Galley | 74—96 |
| 2,922,940 | 1/1960 | Mergler | 318—162 |
| 2,946,993 | 7/1960 | Livingston | 340—347 |
| 2,966,670 | 12/1960 | Fass | 340—347 |
| 2,969,490 | 1/1961 | Andersun et al. | 318—162 |
| 2,970,306 | 1/1961 | Zieman et al. | 340—347 |
| 3,021,075 | 2/1962 | Spencer | 235—197 |
| 3,022,953 | 2/1962 | Udall | 235—197 |
| 3,058,657 | 10/1962 | Tripp. | |
| 3,195,111 | 7/1965 | Kunkel | 318—162 X |

FOREIGN PATENTS 1,158,197   6/1958   France.

ORIS L. RADER, *Primary Examiner.*

T. LYNCH, *Assistant Examiner.*